United States Patent [19]

Hatai

[11] 4,122,429
[45] Oct. 24, 1978

[54] APPARATUS FOR MEASURING WATER DEPTH

[75] Inventor: Akira Hatai, Osaka, Japan

[73] Assignee: Tashiro Fukumoto, Kobe, Japan

[21] Appl. No.: 771,676

[22] Filed: Feb. 24, 1977

Related U.S. Application Data

[63] Continuation-in-part of Ser. No. 644,413, Dec. 24, 1975, abandoned.

[30] Foreign Application Priority Data

Dec. 25, 1974 [JP] Japan .................................. 50-3426

[51] Int. Cl.² .............................................. G01S 9/68
[52] U.S. Cl. .................................. 340/3 R; 340/1 C; 73/290 V
[58] Field of Search ................. 73/290 V; 116/129 H, 116/129 T; 177/42; 340/1 C, 3 R; 343/5 DP

[56] References Cited

U.S. PATENT DOCUMENTS

| 962,332 | 6/1910 | Forbes | 177/42 X |
|---|---|---|---|
| 2,753,542 | 7/1956 | Rod et al. | 340/3 R |
| 3,229,245 | 1/1966 | Hurdle et al. | 343/5 DP X |
| 3,673,554 | 6/1972 | McAlpin | 340/3 R |
| 3,745,829 | 7/1973 | Franchi | 73/290 V |
| 3,787,802 | 1/1974 | Brahman | 340/3 R |
| 3,942,149 | 3/1976 | Westfall, Jr. | 340/3 R |
| 3,968,491 | 7/1976 | Silberberg | 340/1 C X |

Primary Examiner—Jerry W. Myracle
Attorney, Agent, or Firm—Wenderoth, Lind & Ponack

[57] ABSTRACT

An apparatus for measuring water depth comprising a range discrimination circuitry and an indication circuitry. The range discrimination circuitry includes a unit pulse generator, digital counters and digital gates. The indication circuitry includes a latch circuit, BCD-to-decimal decoders and indication lamps.

9 Claims, 12 Drawing Figures

APPARATUS FOR MEASURING WATER DEPTH

This application is a continuation-in-part of my copending U.S. Patent Application Ser. No. 644,413 filed Dec. 24, 1975, now abandoned.

BACKGROUND OF THE INVENTION

The present invention relates to a system for measuring depth by measuring the time delay between the transmission of a high frequency sound impulse and the return of the reflected signal.

There are some depth measuring systems such as seen in U.S. Pat. No. 3,942,149, which may have a range portion select feature for a depth display where certain portions of depth range may be selected for finer indication. However, there is a problem with this range portion selector because when the depth is near the border between two range portions, the observer of the display must consciously determine when to change over the select switch to either of the two portions as the depth changes.

SUMMARY OF THE INVENTION

The principal object of this invention is to overcome this problem by overlapping parts of two adjacent range portions to each other, thereby eliminating the necessity of consciously noting an indication on the border line between the two range portions.

Another object of this invention is to provide an easily readable display.

BRIEF EXPLANATION OF THE DRAWINGS

A preferred embodiment of the present invention is described as taken together with the accompanying drawings, in which.

DETAILED DESCRIPTION OF THE INVENTION

Figure 1:
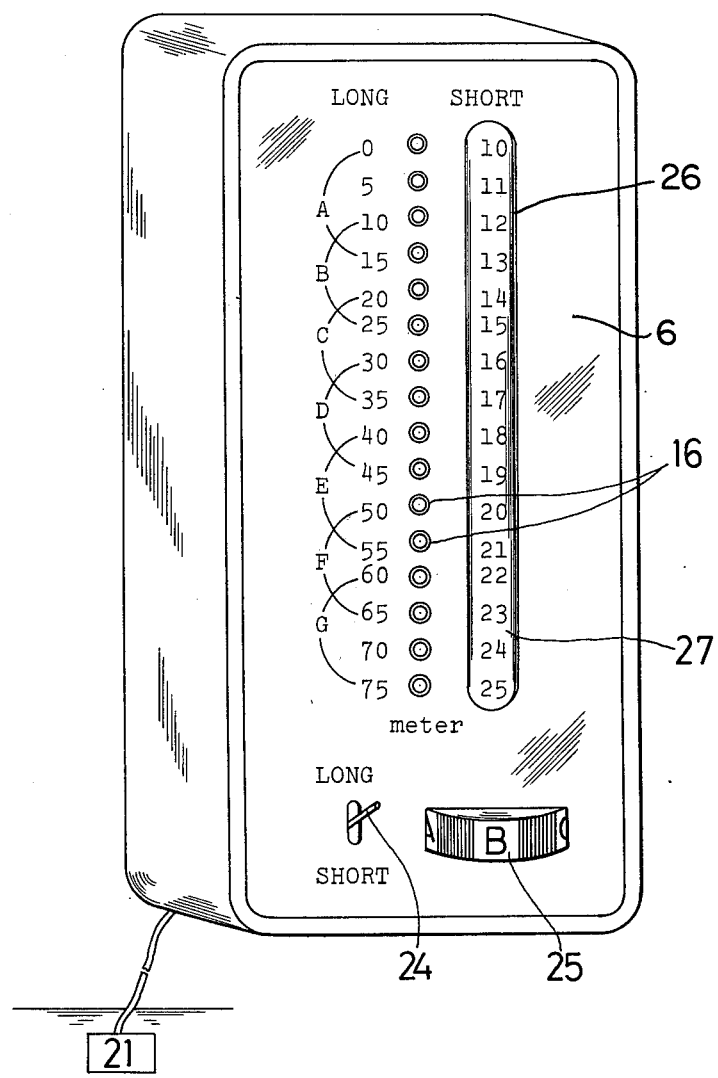
FIG. 1 is an outside view of the apparatus according to the invention.
Figure 11:
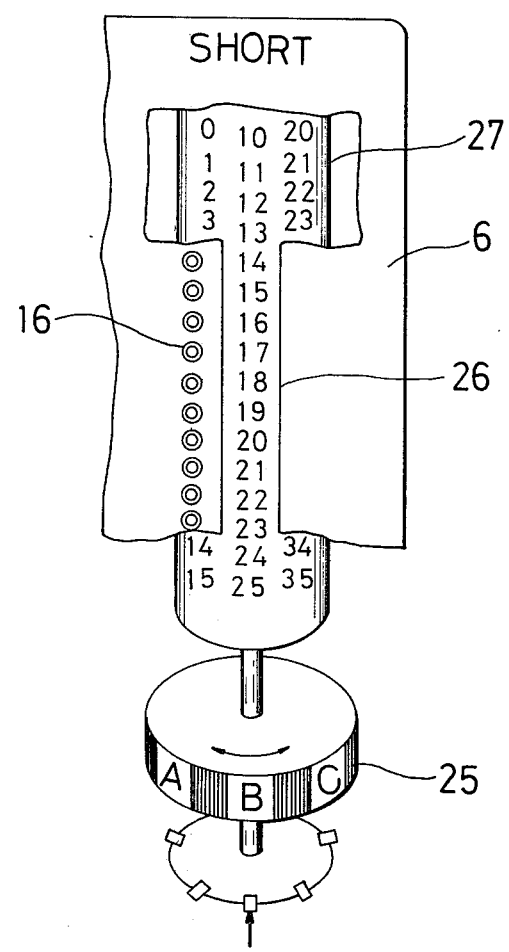
FIG. 11 is a perspective view showing part of the display unit in more detail of FIG. 1.

As shown in FIG. 1, the system has in its front panel 6 sixteen LEDs (light emitting diodes) 16 preferably vertically lined at regular intervals. Each of the LEDs is numbered on its one side to show every 5 meters of water depth from 0 to 75 meters for the full long or rough range scale. On the other side of the LEDs is a scale cylinder 27 which has 7 vertical groups of scale numbers corresponding to the LEDs 16 to indicate short or fine ranges, in this instance for every 1 meter, as best shown in FIG. 11. The various scale groups are assigned marks A-G, each group beginning with 0 or every 10 meters and covering 15 meters so that each group has 1 or 2 overlapped or duplicate margins of 5 meters over the neighboring groups. Cylinder 27 is turned manually with a rotary switch 25 having the alphabetical marks thereon, so that one of the number groups A-G will appear within an elongated window or slot 26 formed through panel 6 on the opposite side of the "long" scale across the LEDs. The long and short ranges are changed with a switch 24.

Figure 12:
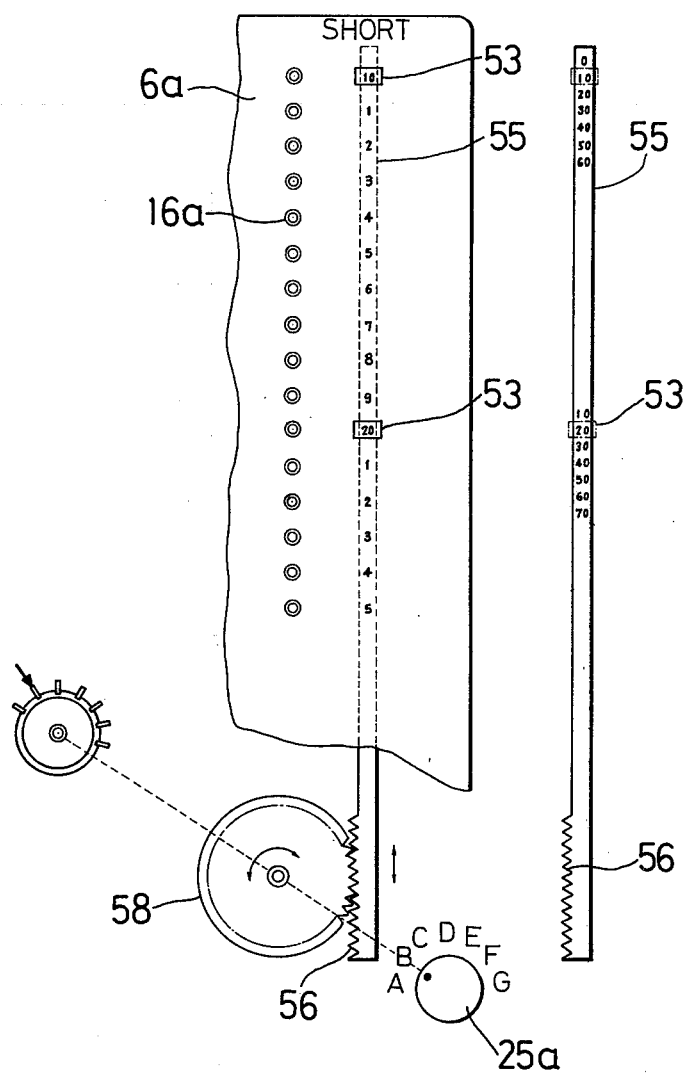
FIG. 12 is a partial view showing another type of the range portion selector somewhat similar to FIG. 11.

FIG. 12 shows a modified typed of the finer range portion select system. A front panel 6a of the display unit is provided with a preferably vertical line of LEDs 16a. Panel 6a is formed with small windows 53 at the righthand side of the top and 11th LEDs. The second to 10th LEDs are numbered serially as 1-9 between the two windows while the 12th to 16th LEDs are numbered as 1-5 below the lower window. A vertical slide member 55 has vertically lined scale numbers for every 10 meters from 0-60 at a predetermined upper portion of the slide member and 10-70 at a predetermined intermediate portion. Slide member 55 is slid up and down through a rack 56 and pinion 58 by turning a rotary switch 25a equivalent to switch 25 of FIG. 1 or 2, so that when one number of the 0-60 group appears within the top window 53, the number greater by ten than the number in the top window 53 will appear in the lower window. Thus, switching the switch 25a will provide seven range portions A-G of the "short" range, each range portion beginning with 0 or every 10 meters, covering 15 meters to be measured on a 1-meter scale, and having one or two margins overlapping that or those of the adjacent range portion(s).

Figure 2:
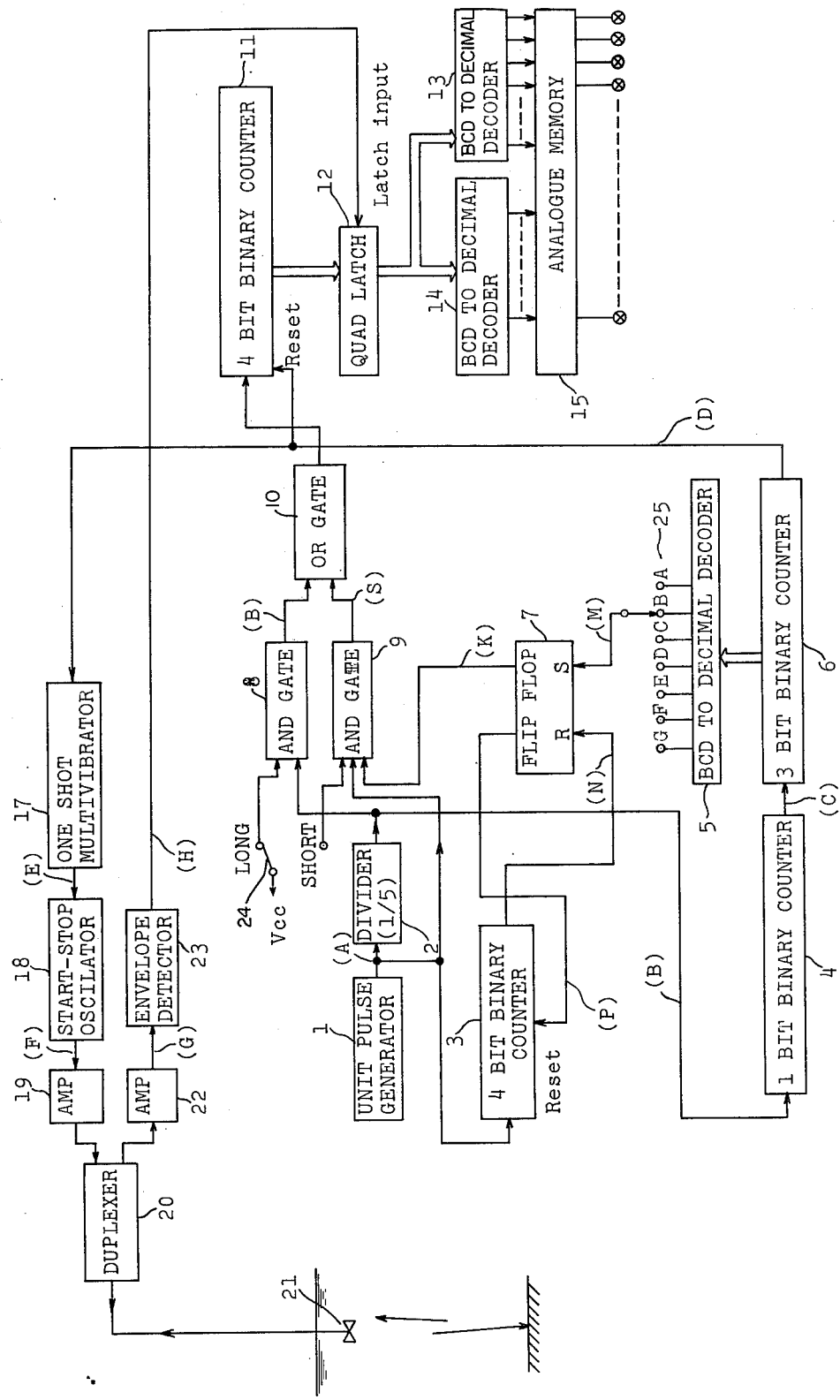
FIG. 2 is a block diagram thereof.

Reference is made now to FIG. 2. A unit pulse oscillator (generator) 1 generates a basic reference or unit pulse during every 1.2 msec. period in which a sound wave reciprocates a unit depth of one meter through the water, as shown at (A) of FIG. 3. The time delay $\Delta t$ between transmission of a sound impulse and return of the signal reflected by an underwater object a meter below the transmitter is calculated as:

$$\Delta t = 2R/v = 2R/1580 \ (m/s)$$

where R is the distance between the object and transmitter or receiver of sound impulse, and $v$ is the speed of soundwaves in the sea water, which is 1,580 m/sec. When R is 1 meter, the time delay $\Delta t$ is approximately 1.2 msec.

Long Range Operation: With the range switch 24 thrown toward the LONG (full) terminal, lamps 16 will be ready to indicate every 5 meters of depth. The 1-meter or 1.2-msec-period unit pulses are frequency-divided by five by a divider 2 into 5-meter or 6-msec-period pulses as shown at B of FIG. 3. These pulses are input into an AND gate 8 and are also frequency-divided in half by a 1-bit binary counter 4 into pulses C which are then divided by 8 by a 3-bit binary counter 6 into pulses D to drive a one-shot multivibrator 17.

Figure 3:
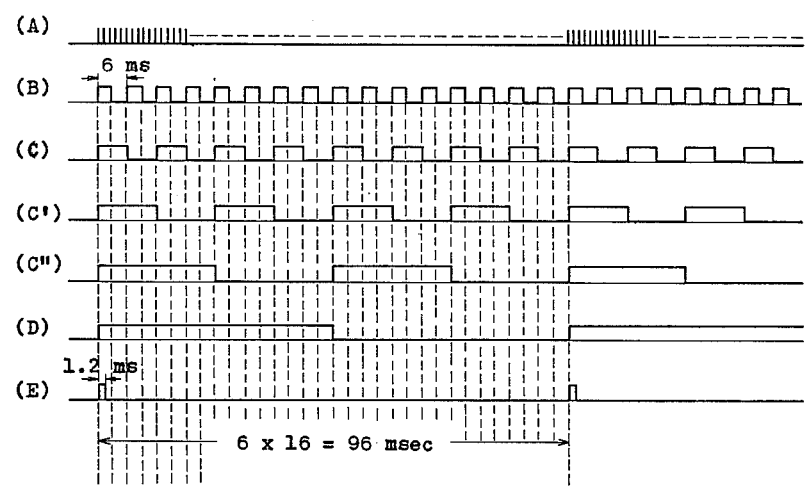
FIG. 3 shows pulses at various points in the case of long range.

Triggered by pulses D, the multivibrator 17 produces pulses E of approximately 1.2-msec-width. A start-stop oscillator 18 generates high frequency impulses, for example of 200 kHz, to be modulated by pulse E. The modulated high frequency impulse signal F is amplified by an amplifier 19, goes through a duplexer 20 and is translated into a sound wave by a transducer 21 before being radiated through the water. FIG. 3 shows the pulses at various points of the circuitry; C' and C" are pulses within the 3-bit binary counter 6. The pulses D also reset a 4-bit binary counter 11 every time the sound impulse is radiated into water.

Figure 4:
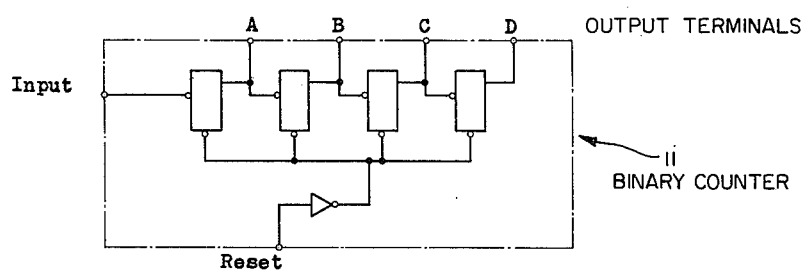
FIG. 4 is a circuit for a counter 11.

With the switch 24 at LONG, a voltage Vcc is applied to the AND gate 8 so that pulses B go through the AND gate 8 and an OR gate 10 to the 4-bit binary counter 11 which is well-known for hexadecimal operation. A circuit diagram of the counter 11 is shown in FIG. 4, while its B.C.D. count sequence is shown in Table 1, where the input pulses B are successively counted into pure binary codes to appear on parallel output terminals A, B, C and D and to be input into a quad latch or coincident circuit 12. The counter 11 thus provides a series of signals, each consisting of parallel outputs or bits A-D, each signal being delayed in time by pulse B from the OR gate 10. For example, if ten 5-meter pulses B (50 meters) are input into the counter, the outputs A, B, C and D will be 0, 1, 0 and 1, respectively.

TABLE 1

| COUNT | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| OUTPUT | A | 0 | 1 | 0 | 1 | 0 |   | 0 | 1 | 0 | 1 | 0 | 1 | 0 | 1 | 0 | 1 |
|  | B | 0 | 0 | 1 | 1 | 0 | 0 | 1 | 1 | 0 | 0 | 1 | 1 | 0 | 0 | 1 | 1 |
|  | C | 0 | 0 | 0 | 0 | 1 | 1 | 1 | 1 | 0 | 0 | 0 | 0 | 1 | 1 | 1 | 1 |
|  | D | 0 | 0 | 0 | 0 | 0 | 0 | 0 | 0 | 1 | 1 | 1 | 1 | 1 | 1 | 1 | 1 |

TABLE 2

| tn | tn + 1 | |
|---|---|---|
| D | Q | $\overline{Q}$ |
| 1 | 1 | 0 |
| 0 | 0 | 1 |

Figure 5:
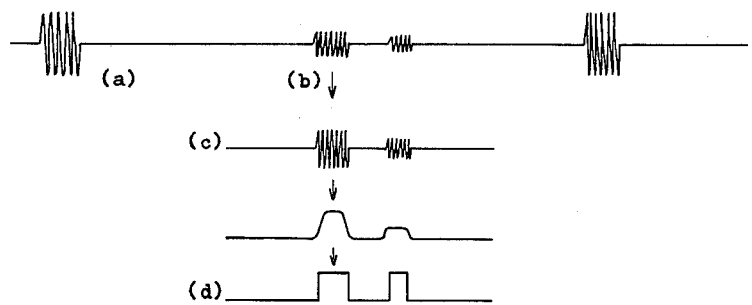
FIG. 5 shows waveforms of transmitted and received signals and input of a latch circuit 12.
Figure 6:
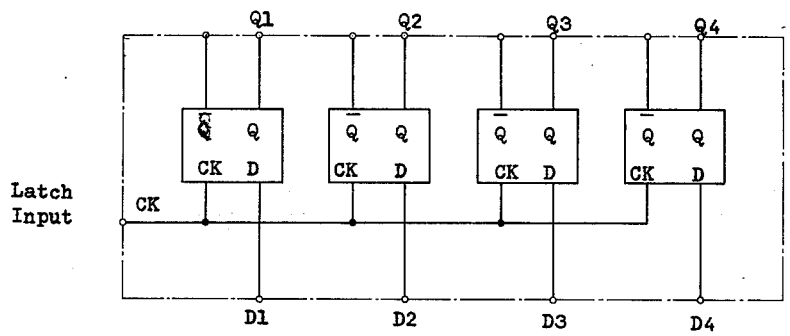
FIG. 6 is a diagram for the latch circuit.

The ultrasonic wave propagated by the transducer 21 is reflected by an obstacle and received by the transducer. The received signal passes though the duplexer 20 and is amplified by an amplifier 22. The amplified signal is detected by an envelope detector 23 to be an echo signal which is the input as a latch input into the quad latch 12. FIG. 5 shows the transmitted signal (a), received signal (b), amplified signal (c) and latch input (d). FIG. 6 shows a circuit diagram of the quad latch 12, while Table 2 shows the truth table. The range information from the counter 11 enters input terminals D1-4 of the latch 12, while the echo signals enter a latch input terminal CK. As the truth table shows, when the latch input is "1", the D inputs are shifted or transferred to output terminals Q1-4, while when the latch input is "0", the Q outputs return to the initial state (0 m.) For example, if an obstacle is 45 meters below the surface, an echo signal enters the latch input and then the ninth outputs of the counter 11 enter the input terminals D1-4 of latch 12. At this instant, the D inputs D1, D2, D3 and D4 are 1, 0, 0 and 1, respectively, which will appear on output terminals Q1-4.

Figure 7:
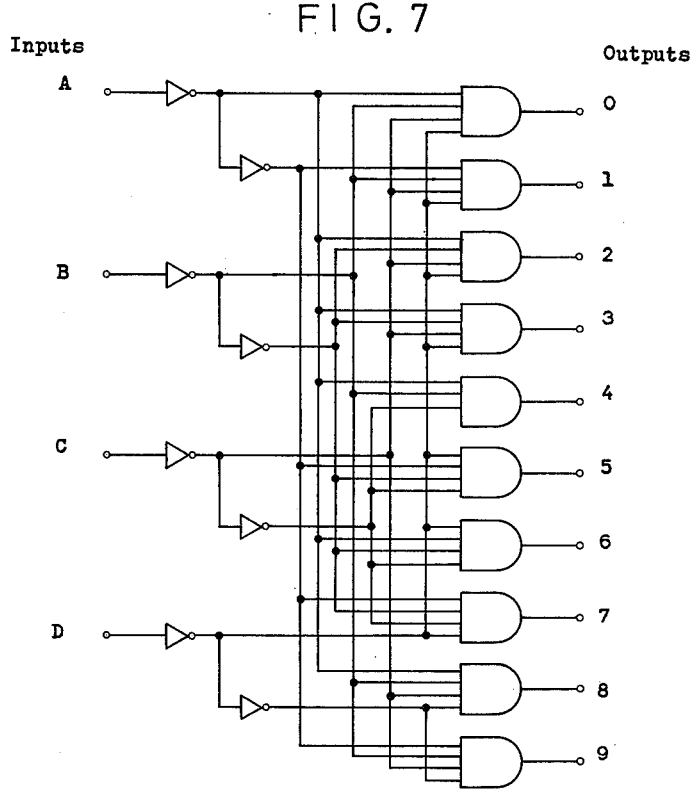
FIG. 7 is a logic diagram of decoders 13 and 14.

The binary Q outputs of the quad latch are converted into a decimal signal by two BCD-to-decimal decoders 13 and 14, a logic diagram of which is shown in FIG. 7, and the truth table of which is shown in Table 3. If the Q outputs which are the input signals of decoders 13 and 14 are the ninth pulse sequence, output 9 of the decoders is "1", while the other outputs are "0". If there is no input into the decoders, output 0 will be "1".

Although 16 parallel decimal outputs of a BCD-to-decimal decoder can theoretically be made with 4-bit BCD inputs, here two such decoders are used and each has 10 decimal output terminals, as practically used.

Figure 8:
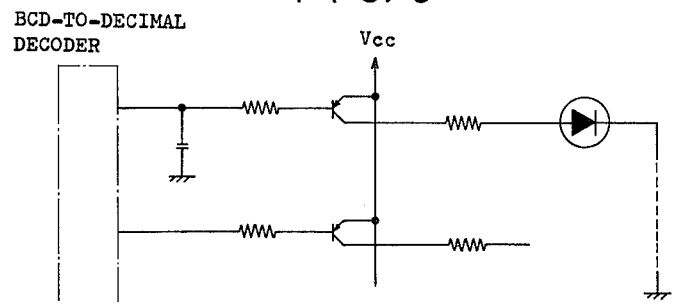
FIG. 8 is a network for the memory circuit.

Since the decoders output a signal for only 6 msec, it is memorized for 300–800 msec by an analog memory 15, as shown in FIG. 8, to finally light the LED 16.

TABLE 3

| Pulse | INPUTS | | | | OUTPUTS | | | | | | | | | | |
|---|---|---|---|---|---|---|---|---|---|---|---|---|---|---|---|
| B | D | B | A | 0 | 1 | 2 | 3 | 4 | 5 | 6 | 7 | 8 | 9 | | |
| 0th | 0 | 0 | 0 | 0 | 1 | 0 | 0 | 0 | 0 | 0 | 0 | 0 | 0 | 0 |
| 1st | 0 | 0 | 0 | 1 | 0 | 1 | 0 | 0 | 0 | 0 | 0 | 0 | 0 | 0 |
| 2nd | 0 | 0 | 1 | 0 | 0 | 0 | 1 | 0 | 0 | 0 | 0 | 0 | 0 | 0 |
| 3rd | 0 | 0 | 1 | 1 | 0 | 0 | 0 | 1 | 0 | 0 | 0 | 0 | 0 | 0 |
| 4th | 0 | 1 | 0 | 0 | 0 | 0 | 0 | 0 | 1 | 0 | 0 | 0 | 0 | 0 |
| 5th | 0 | 1 | 0 | 1 | 0 | 0 | 0 | 0 | 0 | 1 | 0 | 0 | 0 | 0 |
| 6th | 0 | 1 | 1 | 0 | 0 | 0 | 0 | 0 | 0 | 0 | 1 | 0 | 0 | 0 |
| 7th | 0 | 1 | 1 | 1 | 0 | 0 | 0 | 0 | 0 | 0 | 0 | 1 | 0 | 0 |
| 8th | 1 | 0 | 0 | 0 | 0 | 0 | 0 | 0 | 0 | 0 | 0 | 0 | 1 | 0 |
| 9th | 1 | 0 | 0 | 1 | 0 | 0 | 0 | 0 | 0 | 0 | 0 | 0 | 0 | 1 |
| 10th | 1 | 0 | 1 | 0 | 0 | 0 | 0 | 0 | 0 | 0 | 0 | 0 | 0 | 0 |
| 11th | 1 | 0 | 1 | 1 | 0 | 0 | 0 | 0 | 0 | 0 | 0 | 0 | 0 | 0 |
| 12th | 1 | 1 | 0 | 0 | 0 | 0 | 0 | 0 | 0 | 0 | 0 | 0 | 0 | 0 |
| 13th | 1 | 1 | 0 | 1 | 0 | 0 | 0 | 0 | 0 | 0 | 0 | 0 | 0 | 0 |
| 14th | 1 | 1 | 1 | 0 | 0 | 0 | 0 | 0 | 0 | 0 | 0 | 0 | 0 | 0 |
| 15th | 1 | 1 | 1 | 1 | 0 | 0 | 0 | 0 | 0 | 0 | 0 | 0 | 0 | 0 |

Figure 9:
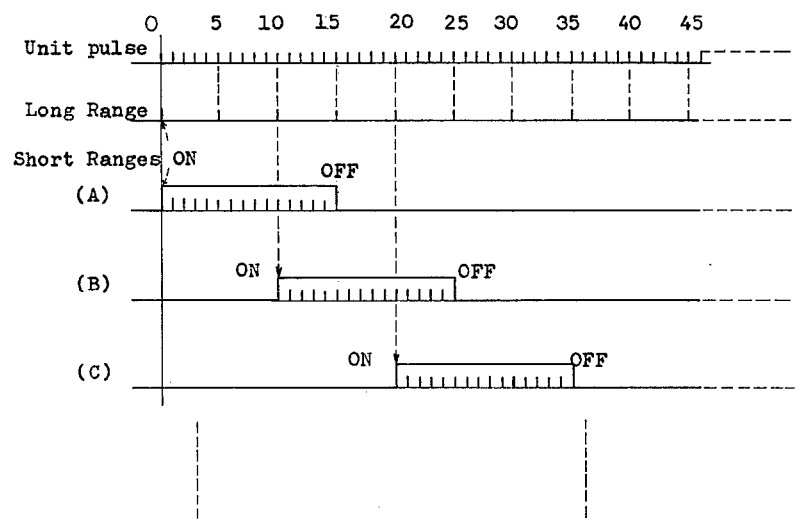
FIG. 9 graphically shows the principle of selecting the short range portions.

Short Range Operation: FIG. 9 shows the principle of selecting the range portions for indicating depth on the one-meter scale, each portion overlapping by 5 meters the adjacent portion(s) to facilitate measurement.

Referring to FIGS. 1 and 2, the switch 24 is thrown into the SHORT terminal to apply voltage Vcc to an AND gate 9 into which unit pulses A and the output D of an FF (flip-flop) 7 are input. When these three inputs are all "1", the AND gate output proceeds through the OR gate 10 to the 4-bit binary counter 11.

Figure 10:
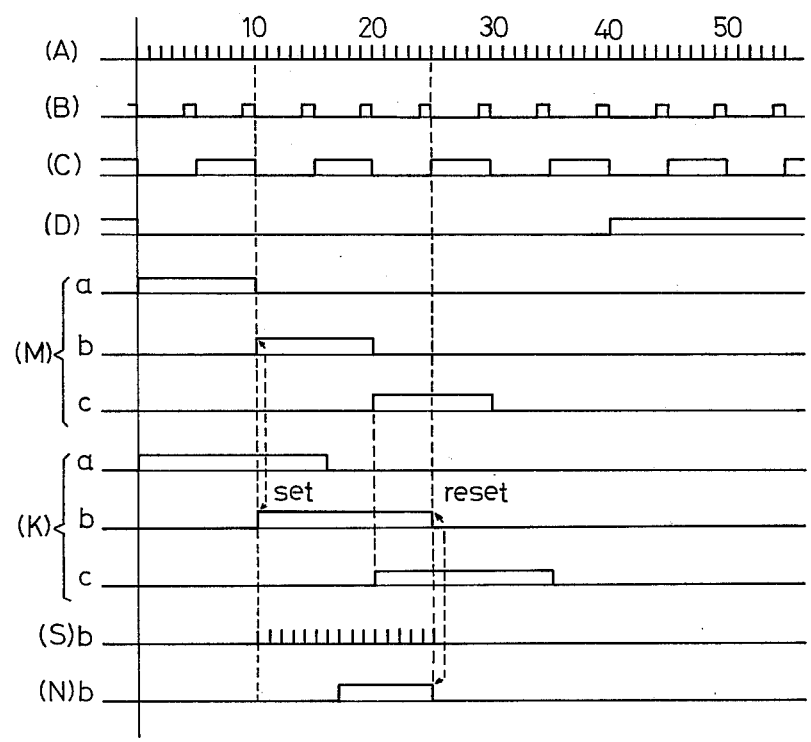
FIG. 10 shows pulses at various points in the case of short range.

A BCD-to-decimal decoder 5 functions in the same way as shown in FIG. 7 and Table 3 for decoder 13 or 14, but has 3-bit binary input and decimal output signals 1–7 on output terminals A-G. As shown in FIG. 10, outputs Ma-Mg appearing on parallel terminals A-G of decoder 5 are a series of delayed pulses each rising at every 0th or 10th unit pulse and lasting for 10 unit pulses. One of the outputs M as selected by using switch 25 will set FF 7.

For example, if range portion B is selected, the signal Mb goes from the decoder 5 into the S (set) input terminal of FF 7. Once set with the signal Mb, FF 7 produces a pulse Kb (FIG. 10) on one output terminal to the gate 9 and a reversal pulse P on the other output terminal to reset a 4-bit binary counter 3. Thus, the moment the gate 9 is turned on by the pulse Kb, the counter 3 begins counting unit pulses A from the 10th one and produces an output signal Nb to reset FF 7 at the 25th unit pulse so that the pulse Kb will last from the 10th to 25th unit pulses. Likewise, pulse Kc will last from the 20th to 35th unit pulses. Thus, each of pulses Ka-g has one or two margins overlapping or duplicating that or those of the adjacent pulse or pulses as just shown.

With the switch 24 on the short terminal, pulse Kb allows the AND gate 9 to pass 16 unit pulses from the 10th and 25th into the counter 11 through the OR gate 10.

The functions from the counter 11 to the LEDs 16 in themselves are essentially the same between the long and the short operations. Accordingly, the short range display system as shown in FIG. 11 or 12 will indicate a 1-meter-fine depth covering 16 meters on one of the range portions A-G as selected by switch 25, each range portion having one or two margins of 5 meters overlapping that or those of the adjacent portions.

The observer of this depth measuring system should first measure a rough depth on the long range. He can then know which one of fine range portions A-G the measured rough depth belongs to, so that he may turn the dial 25 or 25a to select the corresponding range portion of the short range display system with scale member 27 or 55, when the switch 24 is at "SHORT".

What is claimed is:

1. An electronic underwater depth gauge comprising:
   unit pulse generating means for generating a unit pulse;
   divider means connected to said unit pulse generating means for frequency dividing the pulse units generated by said pulse generating means;
   first binary counter means connected at the inlet thereto to said divider means for further frequency dividing the pulses divided by said divider means;
   sound wave generating and receiving means connected to said first binary counter means for generating and converting high frequency impulses from pulses from said first binary counter means into sound waves and for receiving and converting reflected sound waves into high frequency impulses;
   a voltage source;
   double switching means connected to said voltage source for directing the voltage from said voltage source, said switching means having first and second positions;
   a first AND gate connected at the input thereinto to said first position of said double switching means and to said divider means;
   an OR gate connected at the input thereto to said first AND gate;
   binary counting and decoding means connected to said OR gate and to said wave generating and receiving means for counting pulses through said OR gate, for comparing said counted pulses from said OR gate and said wave generating and receiving means, and for converting said binary pulses to decimal signals and storing said decimal signals, said binary counting and decoding means further being connected to said first binary counter means for being reset by the pulses therefrom;
   visual display means connected to said binary counting and decoding means for visually displaying the decimal signals stored therein;
   a second AND gate connected at the input thereinto to said second position of said double switching means and at the outlet therefrom to said OR gate, said second AND gate further being connected to said unit pulse generating means;
   second binary to decimal decoder means connected to said first binary counter means for converting the binary input signals from said counter means to a series of delayed decimal output pulses, said second decoder means having a plurality of outlets therefrom for said delayed pulses;
   switching means connected to said second binary to decimal decoder means for selecting an output terminal from said decoder means; and
   pulse setting means connected between said second AND gate and said switching means and further having pulse input from said unit pulse generating means for producing and directing a regulated pulse to said second AND gate based on said selected decimal output signals from said second binary to decimal decoder, whereby when said second AND gate receives in unison a voltage from said double switching means, and appropriate signals from said unit pulse generating means and said pulse setting means, and said second AND gate is opened to said OR gate.

2. An electronic underwater depth gauge as claimed in claim 1, wherein said sound wave generating and receiving means is comprised of:
   high frequency impulse generating means connected to said first binary counter means for producing pulses and generating a high frequency amplified impulses;
   a duplexer connected to said high frequency impulse generating means;
   transducer means connected to said duplexer for translating said amplified high frequency impulses into saound waves, and for receiving sound waves and converting said sound waves into high frequency impulses and returning said convered sound waves to said duplexer; and
   envelop detector means connected to said duplexer for producing echo signals coincident in time with one of said reflected sound impulses.

3. An electronic underwater depth gauge as claimed in claim 1, wherein said binary counting and decoding means is comprised of:
   a second binary counter means connected at the input thereinto to said OR gate for converting input pulses thereinto into pure binary codes which appear on a plurality of parallel outlet terminals, said second binary counter means further being connected to and receiving input from said first binary counter means, said signals to said parallel outlets being delayed in time by pulses from said OR gate;
   a quad latch having input terminals connected to said outlet terminals of said second binary counter means and said sound wave generating and receiving means and further having four output terminals therefrom;
   first binary to decimal decoder means connected to said output terminals of said quad latch for converting the binary output signals from quad latch into decimal signals; and
   analog memory means connected to said first binary to decimal decoder means for storing the output signal of said first binary to decimal decoder.

4. An electronic underwater depth gauge as claimed in claim 1, wherein said visual display means is comprised of a plurality of light emitting diodes connected to said binary counting and decoding means.

5. An electronic underwater depth gauge as claimed in claim 1, wherein said pulse setting means is comprised of:
   a third binary counter means connected to said unit pulse generating means for counting unit pulses generated by said pulse generating means; and
   a flip flop switch means receiving output from and providing input into said third binary counter means and also connected between said switching means and said second AND gate, said flip flop switch means producing a pulse from said second bianry to decimal decoder means to said second AND gate regulated in sequence by the unit pulses counted by said third binary counter means.

6. An electronic underwater depth gauge as claimed in claim 1, wherein said switching means is comprised of:
- a rotary switch interlocked with said plurality of outlet terminals of said second binary to decinal decoder means, said switch being rotatable between and in contact with said plural outlets of said pulse setting means; and
- a scale member interconnected with said switch and having a plurality of scale markings indicating different depth ranges corresponding to said individual outlets on said second binary to decimal decoder, said scale member markings being aligned with said visual display means.

7. An electronic underwater depth gauge as claimed in claim 1, wherein said switching means is comprised of:
- a stationary panel having a plurality of equally spaced first openings therein corresponding to said visual display means and at least one second opening therein adjacent said first openings corresponding to a predetermined position of said first openings, said first openings being numbered;
- a sliding scale member behind said second opening, said scale member having scale marking thereon which appear in said second opening; and
- a movable switching member connected to said sliding scale member, whereby said scale member may be moved, and connected between said outlet terminals of said second binary to decimal decoder and said pulse setting means, the outlet terminal in contact with said switch member varying with the movement of said switch member.

8. An electronic underwater depth gauge as claimed in claim 7, wherein:
- said switching member has a pinion portion on the outer surface thereof; and
- said sliding scale member has a rack portion at one end thereof in contact with said pinion portion, whereby movement of said switching member between said outlets causes said scale member to move.

9. An electronic underwater depth gauge as claimed in claim 7, wherein:
- said stationary panel has at least two second openings therein adjacent said first openings corresponding to predetermined positions of said first openings; and
- said sliding scale member has spaced scale markings thereon, said scale markings being different by the number of first openings between said second openings.

* * * * *